Dec. 1, 1959   C. A. JOHANNESEN   2,915,186
MAGNETIC PIPE LINE TRAP
Filed July 18, 1955   3 Sheets-Sheet 1

INVENTOR.
Conrad A. Johannesen
BY
Charles L. Lovenbeck
attorney

Dec. 1, 1959     C. A. JOHANNESEN     2,915,186
MAGNETIC PIPE LINE TRAP

Filed July 18, 1955     3 Sheets-Sheet 3

INVENTOR.
Conrad A. Johannesen
BY
Charles L. Lovercheck
attorney

United States Patent Office 2,915,186
Patented Dec. 1, 1959

2,915,186

MAGNETIC PIPE LINE TRAP

Conrad A. Johannesen, Erie, Pa., assignor to Eriez Manufacturing Company, Erie, Pa., a corporation of Pennsylvania Application July 18, 1955, Serial No. 522,528

1 Claim. (Cl. 210—223)

This invention relates to magnetic pipe line traps.

This application is a continuation in part of patent application, Serial No. 448,495, filed August 9, 1954, which issued as Patent No. 2,830,705 on April 15, 1958.

Magnetic pipe line traps have been in general use for some time for the purpose of removing tramp iron from liquids moving through the pipes to protect pumps, screens, and other machinery. A secondary function is that of clarifying the product from iron particles. There are many instances where the problem of removing relatively small particles of iron in magnetic scale, etc. from a product has been encountered. None of the traps made previous to the present invention are capable of doing an efficient job of separating fine particles of iron and fine particles of iron scale from moving liquids and yet have a reasonably large capacity. The only magnetic separators or filters which approached or even came near removing fine particles of iron and magnetic scale from moving liquids had relatively small capacity for the retention of the fine particles. The openings through the grates or strainers were so small that they would become blocked after having caught a relatively small amount of iron.

All previous traps have depended upon thinning out the flow of liquid over a strong plate type magnet. Some have utilized a trap which was more nearly an approach to the gravity type plumbing trap. This design made it extremely difficult to hold pressures of any magnitude because of the relatively large flat surface involved. This type of trap was difficult to seal because it depended upon a flat gasket which was not retained and into which pressure must be applied by a multiplicity of nuts threaded on studs. Traps made with a magnetic element in the bottom were difficult to clean because when the trap was cleaned by removing the bottom, the liquid trapped therein was dumped out, with a resulting hazard to the operator. The intricate shape of this type of trap made it difficult to clean and to make it sanitary and it was most difficult to polish the metal to make the surface completely sanitary. It was also difficult to polish the exterior to obtain a pleasing appearance.

The trap disclosed herein has an interior surface which can be readily machined and polished to obtain the ultimate in sanitary finish. The exterior is simple and easy to polish. The inside has no cracks or crevices to trap dirt and the magnetic elements mounted in the cover and the end plugs of the tubes are made as an integral part of the tubes by means of silver solder or like connections. The arrangement of magnetic tubes will cause the liquid to flow and impinge upon the tubes, thus taking advantage of the material change in direction and the difference in inertia between the tramp iron and the material conveying it.

When materials are being handled at relatively high velocity, there is always a tendency for the iron which has been caught by the magnetic element to wash off of the element. The tube design provided herein provides the possibility for the iron to work around the tube toward the downstream side thereof and, thereby, be protected against this washing action. It will be noted that the magnetic tubes are arranged to form a pocket inside which the material will flow. The pocket tends to to spread the material downward and upward in the body and cause it to pass in close proximity around and between the magnetic tubes, causing the material to flow in relatively thin streams and, therefore, close to the magnetic elements without causing a restriction or excessive size requirement of the housing. When the trap is installed with the closure upward, a sump will be provided which will trap heavy obstacles such as stones. The trap disclosed herein is easy to clean since a single wheel is used to tighten the magnetic element against the O-ring gasket. This wheel can be used to hold the magnetic element so that the tube can be wiped clean of accumulated iron. It will be noted that there are no loose parts to be lost and the hold-down assembly is so designed that it can be completely and easily disassembled for washing, when necessary, on sanitary applications.

More specifically, it is an object of this invention to provide a magnetic trap for pipe lines wherein the magnetic elements are arranged in a manner for efficient removal of tramp iron from liquids flowing therein.

Another object of the invention is to provide a magnetic trap wherein the magnetic elements cooperate with a sump into which they extend for removing tramp iron from fluid.

Another object of this invention is to provide an improved type of cover fastening mechanism in a magnetic trap.

A further object of the invention is to provide a magnetic trap for pipe lines which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claim, it being understood that changes may be made in the form, size, proportions, and minor details of construction without departing from the spirit or sacrificing any of the advantages of the invention.

Figure 1:
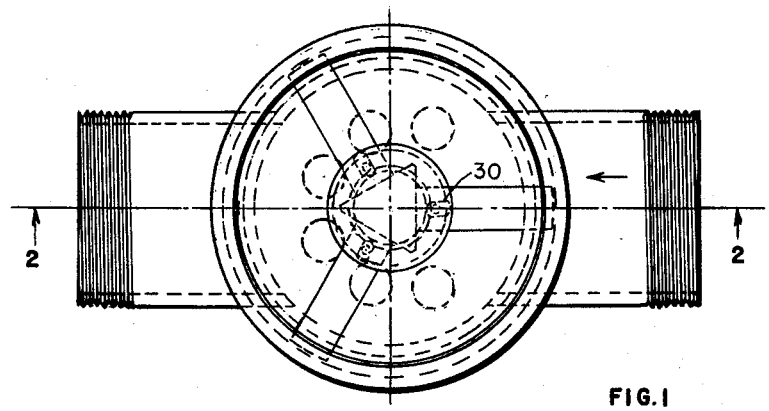
Fig. 1 is a top view of a magnetic trap according to the invention.
Figure 2:
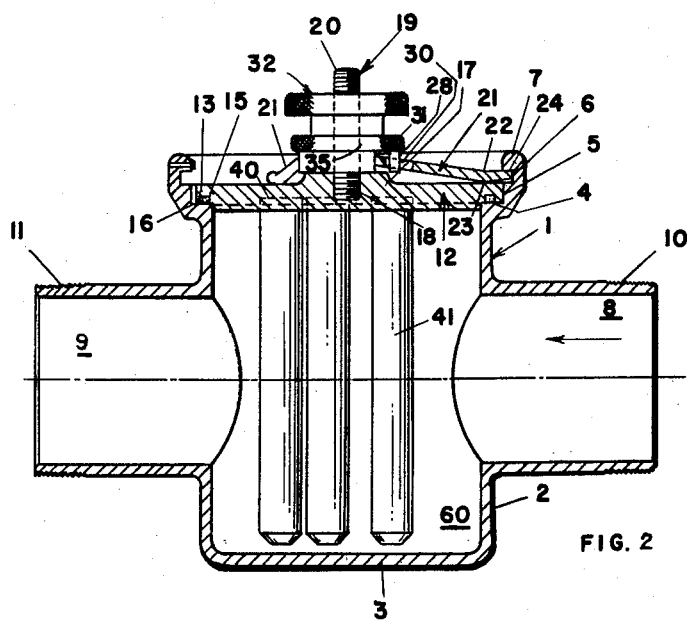
Fig. 2 is a cross sectional view taken on line 2—2 of Fig. 1.
Figure 3:
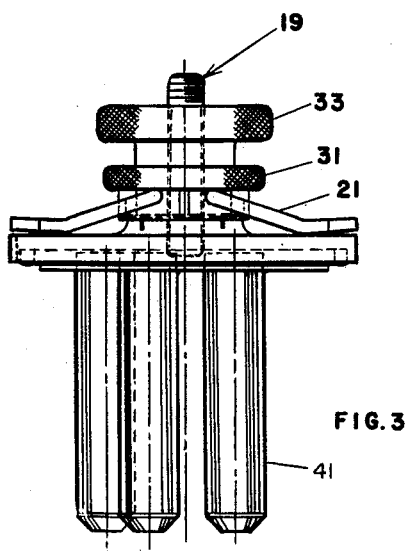
Fig. 3 is a cross sectional view of the magnetic element removed from the trap.
Figure 4:
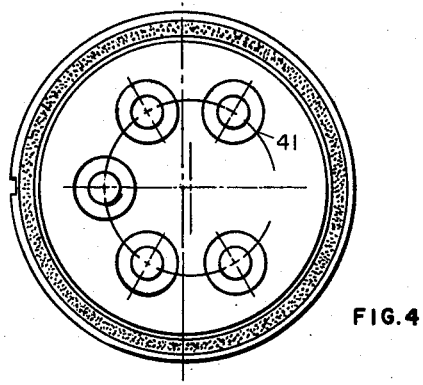
Fig. 4 is a plan view of the cover shown in Fig. 3.
Figures 5, 6, 7:
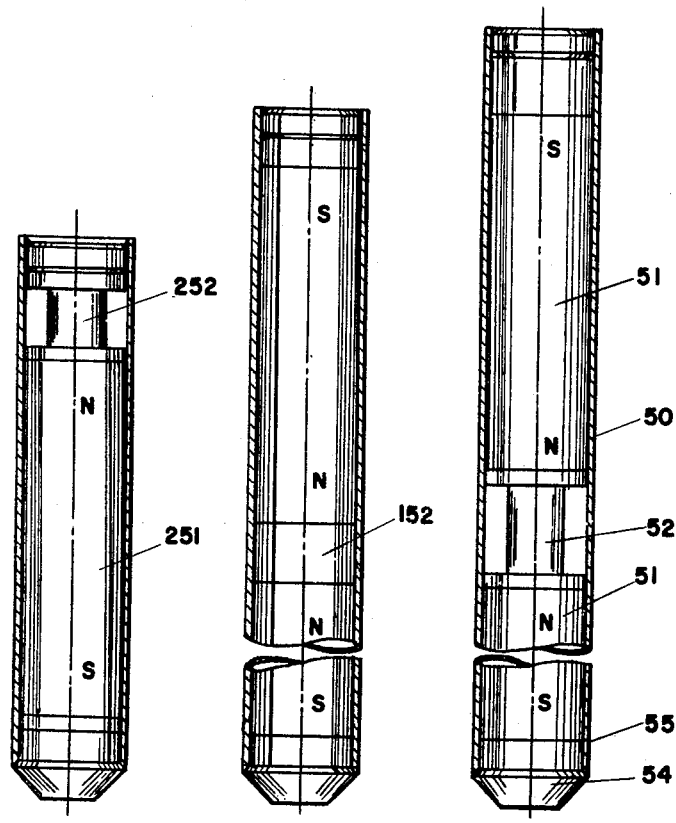

Figs. 5, 6, and 7 are detailed views of magnetic elements for use in the trap disclosed herein.

Now with more specific reference to the drawings, a magnetic trap is disclosed having a body portion 1 made up of a container having upwardly extending cylindrical sides 2 with a bottom closure 3 and an open top. The sides 2 terminate at the upper side thereof in a flat shoulder portion 4 which is surrounded by a peripheral upwardly extending portion 5 having a circumferential groove 6 therein and terminating at the upper edge in a rounded edge 7 which gives the trap a pleasing appearance and protects the operator against injury. The cylindrical portions 2 have an inlet 8 and an outlet 9 which are threaded at 10 and 11, respectively.

A cover 12 is made up of a circular plate having upper edges 13 extending outwardly to form a flange having a groove 15 cut therein which receives an O-shaped washer 16. The central portion of the cover 12 has a boss 17 having a threaded bore 18 therein which receives a threaded stud 19 which extends upwardly and has a threaded end 20 thereon. Outwardly extending arms or spider members 21 are bent upwardly at 22 to form a fulcrum point 23 which engages the cover 12 and the outer upper end 24 engages the underside of the groove 6. Pins 28 extend through slots 30 in the spider members 21 and the pins 28 are fixed to a lower flange 31 of the spider body 35. A nut 32 is threadably attached to the upper threaded end 20 and nut 32 bears down on the spider body 35 to force it downward and cause the fulcrum point 23 to force the cover 12 downward into sealing engagement with the O-washer 16 and the shoulder 4.

A plurality of spaced bores 40 are arranged in a semicircle around the center of the central axis of the stud 19 and magnetic tubes 41 are fitted into the bores 40 and attached thereto by silver soldering or the like. The tubes 41, as shown in Figs. 5 to 7, have a non-magnetic tubular container 50 which has spaced magnetic slugs 51 disposed therein and held in separate spaced relation by non-magnetic spools 52. The spools 52 could be slugs as shown in Fig. 6 at 152 or they could be short spools as shown in Fig. 5 at 252. All of the tubes 50 are closed by means of a magnetic slug 54 which may be soldered at 55 into the tubes 50.

The magnetic slugs 51 are disposed in the tubes 50 with like poles adjacent each other as shown in Figs. 6 and 7. That is, the north poles will be adjacent north poles and south poles will be adjacent south poles. Since like poles repel each other, the magnetic flux passing between unlike poles of the magnetic slugs 51 will be very dense between the magnets and since the flux field of each slug will be in an opposite direction to the flux of the field adjacent it, a plurality of magnetic fields will extend between the north and south poles of the magnets. Also, since like poles in adjacent tubes are disposed adjacent like poles of corresponding magnets in adjacent tubes, the magnetic flux produced by each magnetic slug will be repelled between tubes and therefore, the flux will not pass from one tube to the other or from one slug to the other but will extend through the space between the tubes and form dense fields therein. This arrangement of magnets provides dense magnetic fields between the spaced tubes and, therefore, intercepts any foreign ferrous material which may tend to pass between the tubes.

During operation, the trap will be connected into a pipe line carrying material to be separated. The magnetic particles will be attracted to the tubes 50 and heavy particles of magnetic material intercepted by the magnetic flux from the field of the tubes 50 will tend to gravitate down into sump 60 and be held there against further movement. It will be apparent that fine magnetic particles caught by the tubes 50 will tend to be washed around to the downstream side of the tubes 50 and the heavier pieces may be urged by gravity and otherwise urged down to the bottom of the sump 60.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A trap comprising a hollow body portion having a closed bottom and an open top, an inlet and an outlet, said inlet and said outlet being disposed in the sides of said body portion intermediate the height thereof, a removable cover for said open top, sealing means disposed between said top and said cover, a plurality of spaced, generally cylindrical shaped magnetic elements attached to said cover and extending downwardly into said hollow body portion, said magnetic elements being disposed on said cover in the form of a semi-circle with the open side of said semi-circle toward said inlet, said body portion terminating at the upper edge thereof in an outwardly directed shoulder, a flange extending upwardly from said shoulder, a groove disposed in said flange spaced above said shoulder, said cover being adapted to rest on said shoulder with its upper surface disposed substantially flush with the lower surface of said groove, a spider member having outwardly extending legs, each leg having one end thereof disposed in said groove, said legs being bent upwardly from the outer end and having their inner ends attached to fastening means on said cover, and means to attach said spider legs to said fastening means, said fastening means comprising a stud like member attached to said cover and a nut on said stud member, said inner ends of said spider legs being attached to a member supported on said stud member and movable downwardly with said nut whereby the outer ends engage the upper edge of said groove and the intermediate portion of said legs engages said cover, thereby forcing said cover into sealing engagement with said body portion.

References Cited in the file of this patent

UNITED STATES PATENTS

| | | |
|---|---|---|
| 1,425,366 | Chapman | Aug. 8, 1922 |
| 1,800,302 | Linde | Apr. 14, 1931 |
| 2,399,994 | Feagin | May 7, 1946 |
| 2,800,230 | Thoma | July 23, 1957 |